United States Patent
Yamaguchi et al.

(10) Patent No.: US 10,712,828 B2
(45) Date of Patent: Jul. 14, 2020

(54) ELECTRONIC DEVICE, RECORDING MEDIUM, AND CONTROL METHOD

(71) Applicant: KYOCERA Corporation, Kyoto (JP)

(72) Inventors: Yuuya Yamaguchi, Yokohama (JP); Taro Iio, Yokohama (JP); Ryohei Nakamura, Yokohama (JP); Tsuneo Miyashita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/935,170

(22) Filed: Mar. 26, 2018

(65) Prior Publication Data

US 2018/0284902 A1    Oct. 4, 2018

(30) Foreign Application Priority Data

Apr. 4, 2017  (JP) .................................. 2017-074757

(51) Int. Cl.
| | |
|---|---|
| *G06F 3/041* | (2006.01) |
| *G09G 5/00* | (2006.01) |
| *G06F 3/01* | (2006.01) |
| *G06F 3/0346* | (2013.01) |

(52) U.S. Cl.
CPC ............ *G06F 3/017* (2013.01); *G06F 3/0346* (2013.01)

(58) Field of Classification Search
CPC . G06F 3/041; G06F 3/045; G06F 3/00; G01R 27/26; G09G 5/00
See application file for complete search history.

(56) References Cited

U.S. PATENT DOCUMENTS

| | | | |
|---|---|---|---|
| 8,933,910 B2 | 1/2015 | Ikeda et al. | |
| 9,335,878 B2 | 5/2016 | Ikeda et al. | |
| 9,507,414 B2 | 11/2016 | Noda et al. | |
| 9,552,072 B2 | 1/2017 | Yamamoto et al. | |
| 2011/0018795 A1* | 1/2011 | Jang ...................... | G06F 3/0304 345/156 |
| 2011/0118877 A1* | 5/2011 | Hwang ..................... | B25J 13/00 700/264 |
| 2012/0047466 A1 | 2/2012 | Noda et al. | |
| 2012/0293456 A1 | 11/2012 | Ikeda et al. | |
| 2013/0002578 A1 | 1/2013 | Ito et al. | |
| 2013/0293454 A1* | 11/2013 | Jeon ........................ | G06F 3/017 345/156 |

(Continued)

FOREIGN PATENT DOCUMENTS

| | | |
|---|---|---|
| JP | 2012-043194 A | 3/2012 |
| JP | 2013-012021 A | 1/2013 |

(Continued)

OTHER PUBLICATIONS

An Office Action; "Notice of Reasons for Refusal," mailed by the Japanese Patent Office dated Jun. 6, 2017, which corresponds to Japanese Patent Application No. 2017-074757, with English language Concise Explanation.

(Continued)

*Primary Examiner* — Pegeman Karimi
(74) *Attorney, Agent, or Firm* — Studebaker & Brackett PC

(57) ABSTRACT

An electronic device includes a proximity sensor and a controller configured to determine a direction of a gesture by a user on the basis of an output from the proximity sensor and in accordance with the hand the user uses to operate the electronic device.

8 Claims, 9 Drawing Sheets

(56) References Cited

U.S. PATENT DOCUMENTS

| | | | |
|---|---|---|---|
| 2015/0077395 A1 | 3/2015 | Ikeda et al. | |
| 2015/0116280 A1* | 4/2015 | Moon | G06F 3/0416 345/178 |
| 2015/0185859 A1 | 7/2015 | Yamamoto et al. | |
| 2015/0346831 A1 | 12/2015 | Nii | |
| 2016/0306437 A1* | 10/2016 | Zhang | G06F 1/1662 |
| 2017/0068321 A1* | 3/2017 | Kuo | G06F 3/017 |
| 2018/0052521 A1* | 2/2018 | Kamiya | G06T 7/20 |
| 2018/0217748 A1* | 8/2018 | Cao | G06F 3/04883 |

FOREIGN PATENT DOCUMENTS

| | | |
|---|---|---|
| JP | 2015-125670 A | 7/2015 |
| JP | 2015-225493 A | 12/2015 |
| JP | 6101881 B1 | 3/2017 |
| WO | 2011/158475 A1 | 12/2011 |

OTHER PUBLICATIONS

An Office Action; "Notice of Reasons for Refusal," mailed by the Japanese Patent Office dated Sep. 5, 2017, which corresponds to Japanese Patent Application No. 2017-074757, with English language Concise Explanation.

* cited by examiner

ELECTRONIC DEVICE, RECORDING MEDIUM, AND CONTROL METHOD

CROSS-REFERENCE TO RELATED APPLICATION

The present application claims priority to and the benefit of Japanese Patent Application No. 2017-074757 filed Apr. 4, 2017, the entire contents of which are incorporated herein by reference.

TECHNICAL FIELD

The present disclosure relates to an electronic device, a recording medium, and a control method.

BACKGROUND

Electronic devices, such as smartphones and tablets, typically include a touch panel. A user typically controls such an electronic device by touching the touch panel. An electronic device that, for example, detects a gesture performed by the user at a distance from the terminal using a proximity sensor such as an infrared sensor and then processes an input operation corresponding to the gesture has been proposed in recent years.

SUMMARY

An electronic device according to an embodiment comprises a proximity sensor; and a controller configured to determine a direction of a gesture by a user on the basis of an output from the proximity sensor and in accordance with a hand the user uses to operate the electronic device.

A non-transitory computer-readable recording medium according to an embodiment includes computer program instructions to be executed by an electronic device comprising a proximity sensor and a controller, the instructions causing the electronic device to determine, using the controller, a direction of a gesture by a user on the basis of an output from the proximity sensor and in accordance with a hand the user uses to operate the electronic device.

A control method according to an embodiment is a control method of an electronic device comprising a proximity sensor and a controller, the control method comprising determining, using the controller, a direction of a gesture by a user on the basis of an output from the proximity sensor and in accordance with a hand the user uses to operate the electronic device.

DETAILED DESCRIPTION

The conventional gesture-based input operation differs from an input operation on a touch panel in that the operation is not performed by touching the electronic device directly. Thus, when a user makes a gesture intended to perform a particular operation, the electronic device might recognize a different operation than the one the user intended. If the gesture that the electronic device recognizes was not the gesture intended by the user, the electronic device might operate erroneously.

In light of these considerations, it would be helpful to provide an electronic device, a recording medium, and a control method that facilitate prevention of erroneous operation during a gesture-based input operation.

(Electronic Device Configuration)

Figure 1:
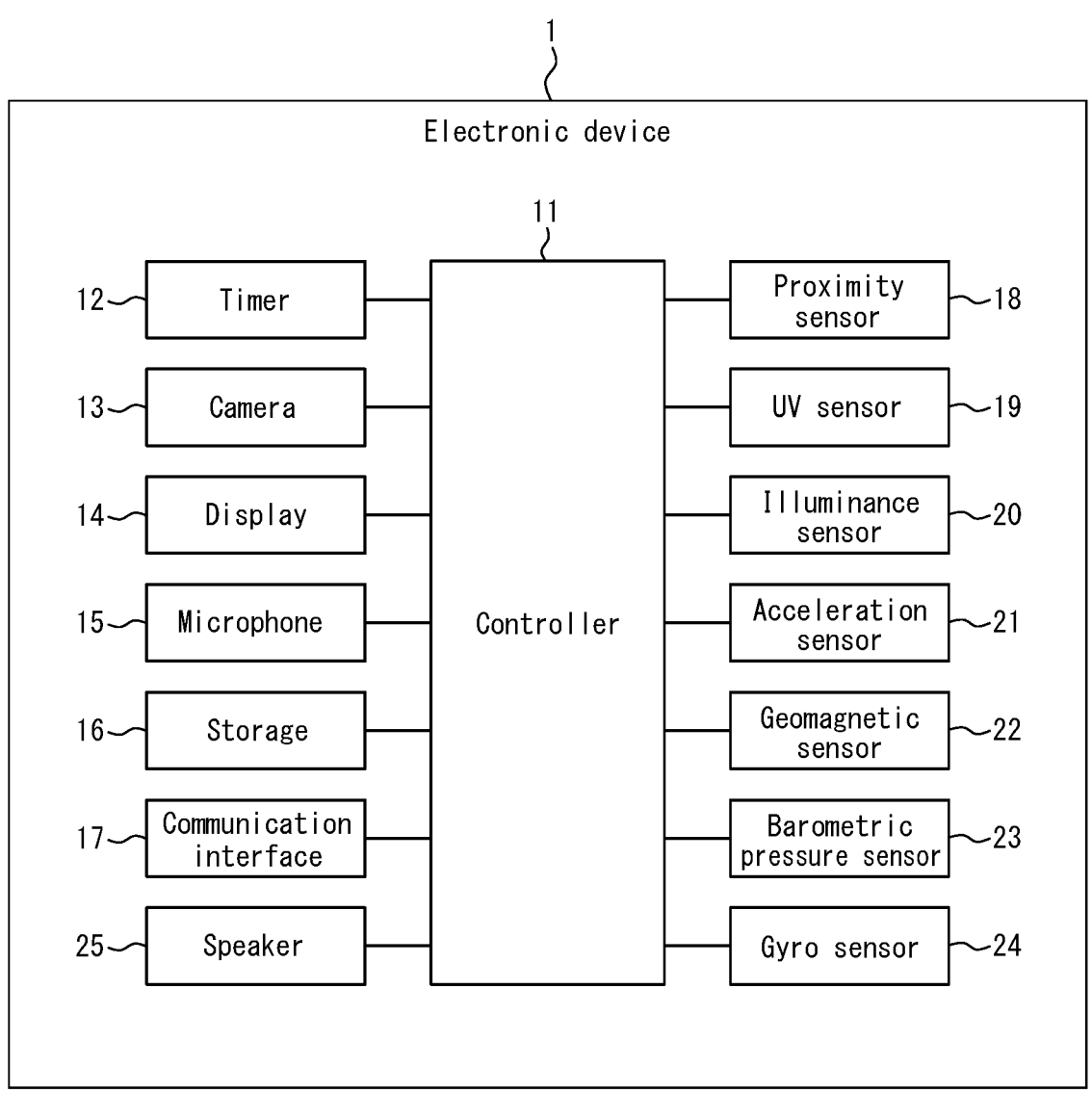
FIG. 1 is a configuration diagram of an electronic device according to an embodiment.

As illustrated in FIG. 1, an electronic device 1 according to an embodiment includes a timer 12, a camera 13, a display 14, a microphone 15, a storage 16, a communication interface 17, a speaker 25, a proximity sensor 18 (gesture sensor), and a controller 11. The electronic device 1 further includes a UV sensor 19, an illuminance sensor 20, an acceleration sensor 21, a geomagnetic sensor 22, a barometric pressure sensor 23, and a gyro sensor 24. FIG. 1 is only an example, and the electronic device 1 need not include all of the components in FIG. 1. Also, the electronic device 1 may include components other than those illustrated in FIG. 1.

The timer 12 receives an instruction for a timer operation from the controller 11. Once a predetermined time has elapsed, the timer 12 outputs a signal indicating that the predetermined time has elapsed to the controller 11. The timer 12 may be provided independently from the controller 11, as illustrated in FIG. 1, or be configured internal to the controller 11.

The camera 13 captures images of subjects around the electronic device 1. One example of the camera 13 is a front camera provided on the same face as the display 14 of the electronic device 1.

The display 14 displays a screen. The screen includes, for example, at least one of characters, images, symbols, graphics, and the like. The display 14 may be a liquid crystal display, an organic electro-luminescence (EL) panel, an inorganic EL panel, or the like. In the present embodiment, the display 14 is a touch panel display (touchscreen display). The touch panel display detects contact by a finger, a stylus, or other object and identifies the contact position. The display 14 can simultaneously detect a plurality of positions contacted by fingers, styli, or other objects.

The microphone 15 detects sound around the electronic device 1, including people's voices.

The storage 16 functions as a memory storing programs and data. The storage 16 temporarily stores the processing results of the controller 11. The storage 16 may include any appropriate storage device, such as a semiconductor storage device or a magnetic storage device. The storage 16 may also include a plurality of types of storage devices. The storage 16 may include a combination of a portable storage medium, such as a memory card, and an apparatus for reading the storage medium.

The programs stored in the storage 16 include applications that run in the foreground or the background and a control program that supports operations of the applications. For example, the applications cause the controller 11 to execute processing corresponding to a gesture. The control program is, for example, an operating system (OS). The applications and control program may be installed on the storage 16 by communication through the communication interface 17 or from a storage medium.

The communication interface 17 is for communicating over a wired or wireless connection. The communication method of the communication interface 17 in an embodiment is prescribed by a wireless communication standard. For example, wireless communication standards include cellular phone communication standards such as 2G, 3G, or 4G. Examples of cellular phone communication standards include long term evolution (LTE), wideband code division multiple access (W-CDMA), CDMA2000, personal digital cellular (PDC), global system for mobile communications (GSM® (GSM is a registered trademark in Japan, other countries, or both)), and personal handy-phone system (PHS). Examples of wireless communication standards include worldwide interoperability for microwave access (WiMAX), IEEE802.11, Bluetooth® (Bluetooth is a registered trademark in Japan, other countries, or both), infrared data association (IrDA), and near field communication (NFC). The communication interface 17 may support one or more of the aforementioned communication standards.

The speaker 25 outputs sound. During a phone conversation, for example, the speaker 25 outputs the other party's voice. When, for example, the news, the weather forecast, or the like is read aloud, the speaker 25 outputs the corresponding sound.

Without contact, the proximity sensor 18 detects the relative distance to an object near the electronic device 1, the movement direction of the object, and the like. In the present embodiment, the proximity sensor 18 includes one infrared light emitting diode (LED) acting as a light source and four infrared photodiodes. The proximity sensor 18 emits infrared light, from the infrared LED acting as a light source, towards an object. Reflected light from the object is incident on the infrared photodiodes of the proximity sensor 18. The proximity sensor 18 can measure the relative distance to the object on the basis of the output current of the infrared photodiodes. The proximity sensor 18 also detects the movement direction of the object by the difference in time at which reflected light from the object is incident on each of the infrared photodiodes. The proximity sensor 18 can thus detect an operation by an air gesture (gesture) that the user of the electronic device 1 performs without touching the electronic device 1. The proximity sensor 18 may include visible light photodiodes.

The controller 11 is a processor such as a central processing unit (CPU). The controller 11 may be a system-on-a-chip (SoC) or other type of integrated circuit in which other components are integrated. The controller 11 may be configured by combining a plurality of integrated circuits. The controller 11 implements a variety of functions by controlling overall operation of the electronic device 1.

Specifically, the controller 11 refers as necessary to data stored in the storage 16. The controller 11 implements a variety of functions by executing instructions included in programs stored in the storage 16 to control other functional components, such as the display 14. For example, the controller 11 acquires data indicating contact by the user from the touch panel, acquires information on a user gesture detected by the proximity sensor 18, acquires information such as the remaining time in the countdown (the timer's time) from the timer 12, and recognizes the running status of an application.

The UV sensor 19 can measure the amount of ultraviolet light included in sunlight or other light.

The illuminance sensor 20 detects the illuminance from surrounding light that is incident on the illuminance sensor 20.

The acceleration sensor 21 detects the direction and magnitude of acceleration acting on the electronic device 1. The acceleration sensor 21 is, for example, a three-axis (3D) sensor that detects acceleration in the x-axis, y-axis, and z-axis directions. The acceleration sensor 21 may, for example, be a piezoresistive type or capacitive type of sensor.

The geomagnetic sensor 22 allows measurement of the orientation of the electronic device 1 by detecting the orientation of the earth's magnetic field.

The barometric pressure sensor 23 detects the barometric pressure outside of the electronic device 1 (atmospheric pressure).

The gyro sensor 24 detects the angular velocity of the electronic device 1. The controller 11 can measure the change in orientation of the electronic device 1 by integrating the angular velocity, acquired by the gyro sensor 24, over time.

(Electronic Device Gesture Operation)

Figure 2:
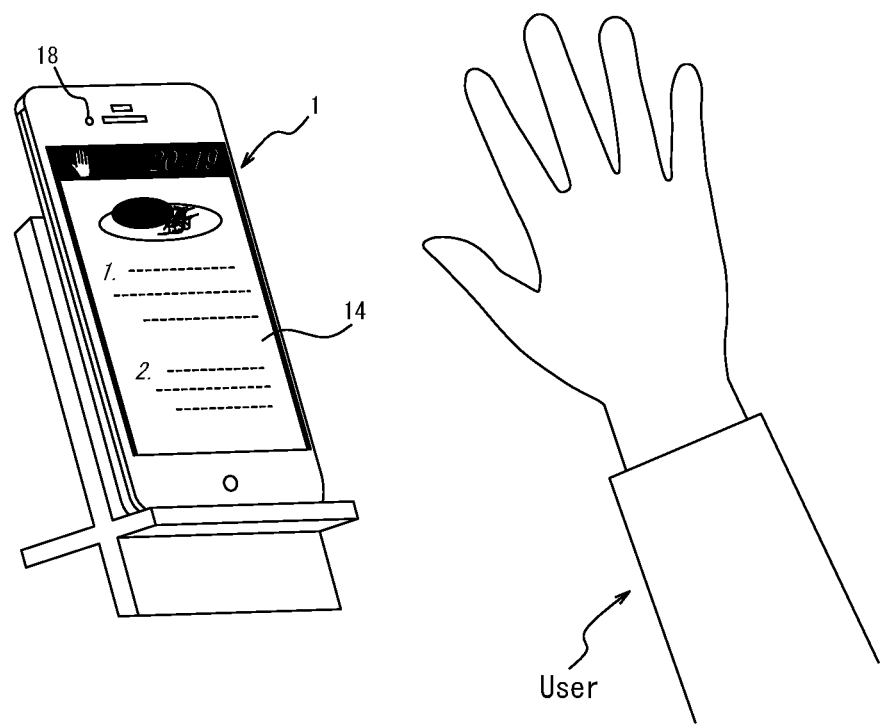
FIG. 2 illustrates a user operating an electronic device with a gesture.

FIG. 2 illustrates the user operating the electronic device 1 with a gesture. In FIG. 2, the electronic device 1 is supported by a stand as an example. Alternatively, the electronic device 1 may be leaned against a wall or placed on a table. Upon the proximity sensor 18 detecting a gesture by the user, the controller 11 executes processing in response to the detected gesture. In the example in FIG. 2, the processing in response to the gesture is scrolling of the screen displaying a recipe. For example, when the user makes a gesture by moving a hand upward in the longitudinal direction of the electronic device 1, the screen scrolls upward in accordance with the movement of the user's hand. When the user makes a gesture by moving a hand downward in the longitudinal direction of the electronic device 1, the screen scrolls downward in accordance with the movement of the user's hand.

The electronic device 1 in FIG. 2 is a smartphone. Alternatively, the electronic device 1 may, for example, be a mobile phone, a phablet, a tablet PC, a feature phone, or other such device. The electronic device 1 is not limited to these examples and may, for example, also be a personal digital assistant (PDA), a remote control, a portable music player, a game device, an electronic book reader, a car navigation device, a household appliance, an industrial device (factory automation (FA) device), or the like.

(Gesture Detection Method)

Figure 3:
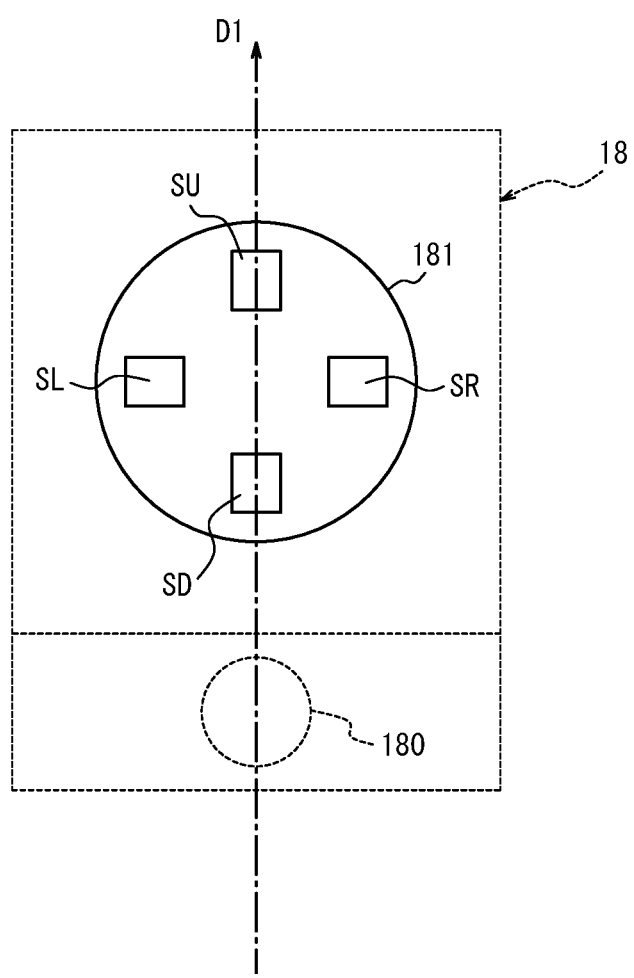
FIG. 3 is a configuration diagram of a proximity sensor.

A method performed by the controller 11 to detect a gesture by the user on the basis of output of the proximity sensor 18 is described below in detail with reference to FIGS. 3 and 4. FIG. 3 illustrates an example configuration of the proximity sensor 18 when the electronic device 1 is viewed from the front. The proximity sensor 18 includes an infrared LED 180 acting as a light source and four infrared photodiodes SU, SR, SD, and SL. The four infrared photodiodes SU, SR, SD, and SL detect reflected light from a detection target through a lens 181. The four infrared photodiodes SU, SR, SD, and SL are arranged symmetrically around the center of the lens 181. The imaginary line D1 illustrated in FIG. 3 is roughly parallel to the longitudinal direction of the electronic device 1. The infrared photodiode SU and the infrared photodiode SD are placed apart on the imaginary line D1 in FIG. 3. The infrared photodiodes SR and SL are placed between the infrared photodiode SU and the infrared photodiode SD in the direction of the imaginary line D1 in FIG. 3.

Figure 4:
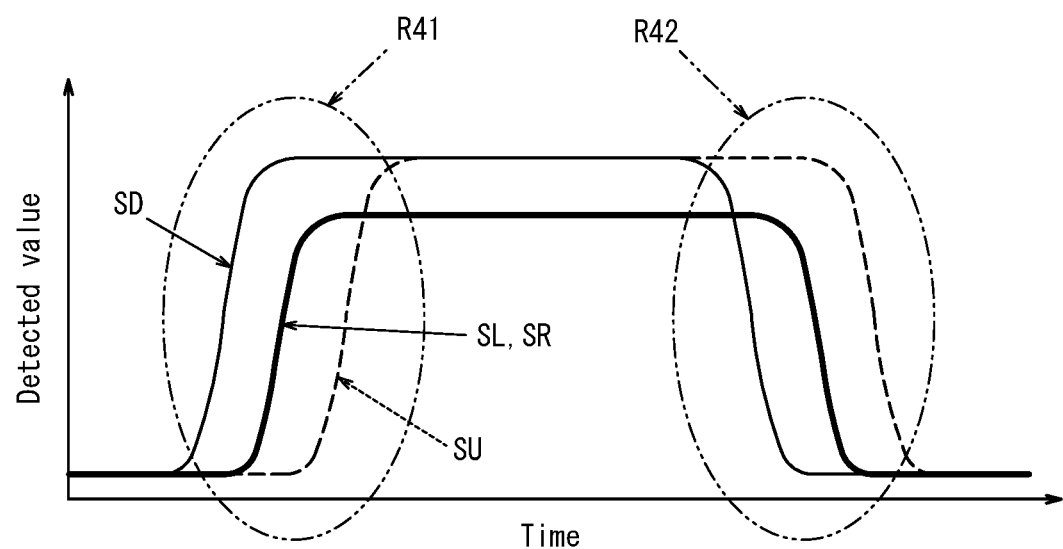
FIG. 4 illustrates the change over time in the value detected by each infrared photodiode.

FIG. 4 illustrates the change over time in the value detected by the four infrared photodiodes SU, SR, SD, and SL as the detection target (for example, the user's hand) moves in the direction of the imaginary line D1 in FIG. 3. The infrared photodiode SU and the infrared photodiode SD are separated the most in the direction of the imaginary line D1. Hence, as illustrated in FIG. 4, the time difference is greatest between the change (for example, increase) in the value detected by the infrared photodiode SU (dashed line) and the same change (for example, increase) in the value detected by the infrared photodiode SD (thin, solid line). By recognizing a predetermined time difference in the change in the value detected by the infrared photodiodes SU, SR, SD, and SL, the controller 11 can judge the movement direction of the detection target.

The controller 11 acquires the value detected by the infrared photodiodes SU, SR, SD, and SL from the proximity sensor 18. To recognize movement by the detection target in the direction of the imaginary line D1, for example, the controller 11 may integrate the result of subtracting the value detected by the photodiode SU from the value detected by the photodiode SD over a predetermined time. In the example in FIG. 4, the integral value in regions R41 and R42 is non-zero. From the change in the integral value (for example, a positive, zero, or negative change), the controller 11 can recognize movement of the detection target in the direction of the imaginary line D1.

The controller 11 may also integrate the result of subtracting the value detected by the photodiode SR from the value detected by the photodiode SL over a predetermined time. From the change in the integral value (for example, a positive, zero, or negative change), the controller 11 can recognize movement of the detection target in a direction orthogonal to the imaginary line D1 (a direction substantially parallel to the transverse direction of the electronic device 1).

Alternatively, the controller 11 may perform calculations using all of the detected values of the photodiodes SU, SR, SD, and SL. In other words, the controller 11 may recognize the movement direction of the detection target without performing calculations to divide the movement direction into components in the longitudinal direction and the transverse direction of the electronic device 1.

The detected gesture may be a left or right gesture, an up or down gesture, a diagonal gesture, a gesture to trace a circle clockwise, a gesture to trace a circle counterclockwise, or other such gesture. For example, the left or right gesture is performed in a direction roughly parallel to the transverse direction of the electronic device 1. The up or down gesture is performed in a direction roughly parallel to the longitudinal direction of the electronic device 1. The diagonal gesture is performed in a plane roughly parallel to the electronic device 1 in a direction not parallel to either the longitudinal direction or the transverse direction of the electronic device 1.

(Kitchen Mode)

Figure 5:
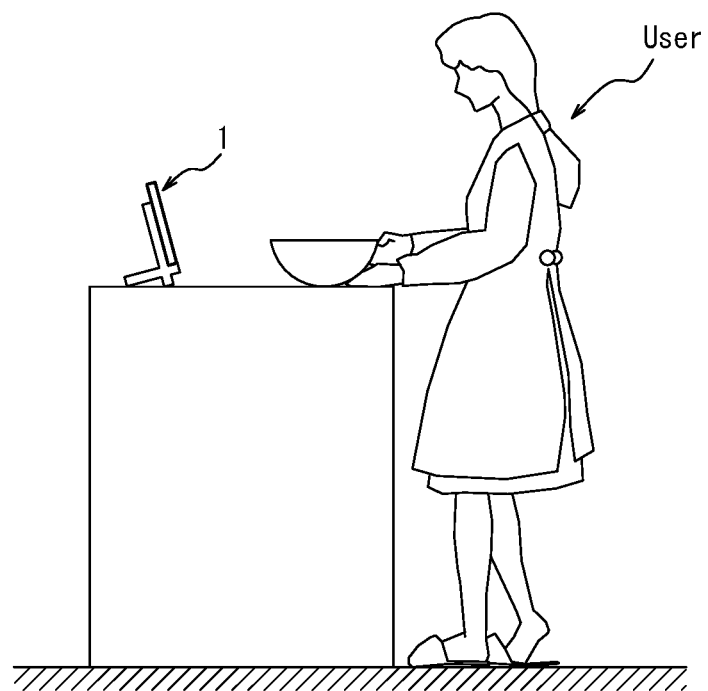
FIG. 5 illustrates an example of conditions in which an electronic device is operated with a gesture.

FIG. 5 illustrates an example of conditions in which the user operates the electronic device 1 with a gesture. In the example in FIG. 5, the user is cooking in the kitchen by following a cooking recipe displayed on the display 14 of the electronic device 1. At this time, the proximity sensor 18 detects a gesture by the user. The controller 11 executes processing in response to the gesture detected by the proximity sensor 18. For example, the controller 11 can execute processing to scroll the recipe in response to a particular gesture (such as the user moving the hand up or down). The user's hand may become dirty or wet while cooking. The user can scroll the recipe, however, without touching the electronic device 1. The display 14 therefore does not become dirty, and dirt on the display 14 can be prevented from getting on the user's hand during cooking.

The electronic device 1 has a plurality of modes. Modes refer to operation modes (operating states or operation statuses) that, for example, place restrictions on the operations of the entire electronic device 1. Only one mode can be selected at a time. In the present embodiment, the modes of the electronic device 1 include a first mode and a second mode. The first mode is a regular operation mode (regular mode) appropriate for use in rooms other than the kitchen or outside of the home, for example. The second mode is an operation mode (kitchen mode) optimal for cooking in the kitchen while a recipe is displayed. As described above, input operations can preferably be made by gestures in the second mode. In other words, when the mode of the electronic device 1 switches to the second mode, the proximity sensor 18 preferably operates in accordance with the switching to allow detection of a gesture. By including the below-described user interface, the electronic device 1 of the present embodiment can operate the proximity sensor 18 in accordance with switching to the second mode (kitchen mode).

(Gesture Direction Determination Method)

Next, processing by the controller 11 of the electronic device 1 to determine the direction of a gesture is described. The processing by the controller 11 to determine the direction of a gesture may, for example, be executed when the electronic device 1 is in the above-described kitchen mode.

In the electronic device 1, the directions detected as gestures may be predetermined. For example, the directions detected as gestures may be determined to be the up and down directions and the left and right directions. For the sake of simplicity, the directions detected as gestures by the electronic device 1 in the present embodiment are described below as being the up and down directions and the left and right directions. In other words, gestures in a diagonal direction are not taken into consideration in the present embodiment. This does not, however, limit the directions detected as gestures by the electronic device 1 according to the present disclosure. Consequently, the electronic device 1 may detect gestures in a diagonal direction using a similar method to the one described below.

In the case of the directions detected as gestures by the electronic device 1 being the up and down directions and the left and right directions, the controller 11 of the electronic device 1 determines whether a detected gesture is an operation in the up, down, left, or right direction. For example, the controller 11 can determine whether the detected gesture is an operation in the up and down directions or an operation in the left and right directions. Upon detecting a gesture, the controller 11 may, for example, decompose the gesture into an up and down direction component (amount of movement) and a left and right direction component (amount of movement). When the up and down direction component is greater than the left and right direction component, the controller 11 determines that the gesture is an operation in the up or down direction. Conversely, when the left and right direction component is greater than the up and down direction component, the controller 11 determines that the gesture is an operation in the left or right direction.

The controller 11 determines the direction of the gesture using judgment criteria, for example. The judgment criteria for determining the direction of a gesture may, for example, be stored in advance in the storage 16.

Figure 6:
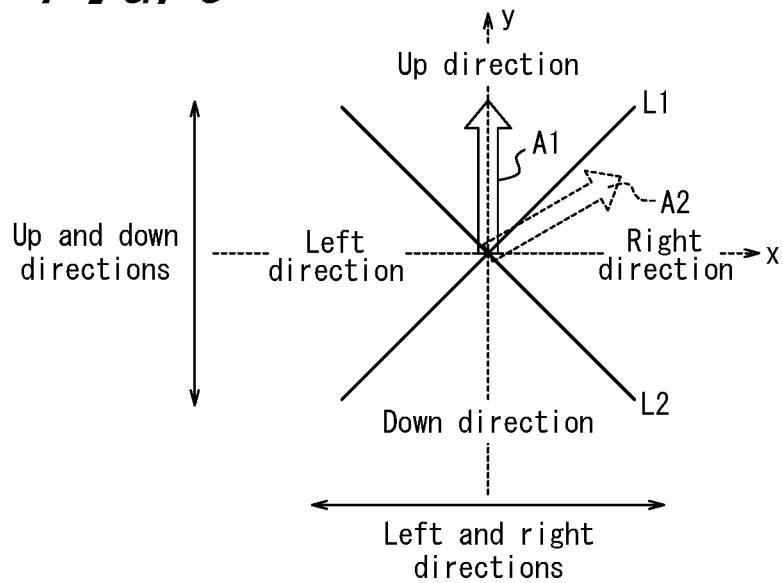
FIG. 6 is a conceptual diagram illustrating the determination of the direction of a gesture.

FIG. 6 is a conceptual diagram illustrating the method of determining the direction of a gesture using the judgment criteria. A Cartesian coordinate system is set in FIG. 6, with the x-axis and the y-axis respectively corresponding to the left and right directions and the up and down directions. As illustrated by the example in FIG. 6, the judgment criteria are constituted by two lines, L1 and L2. In the present disclosure, a positive angle is measured counterclockwise from the positive direction of the x-axis (0 degrees). Hence, the positive direction of the y-axis is at 90 degrees.

The judgment criteria illustrated in FIG. 6 are set so that the line L1 is at 45 degrees, and the line L2 is at negative 45 degrees (i.e. 135 degrees). In other words, the line L1 and line L2 are orthogonal in the judgment criteria illustrated in FIG. 6. The four regions divided by the line L1 and line L2 are associated with the up direction, the down direction, the right direction, and the left direction. Specifically, among the four regions divided by the two lines L1 and L2, the region from negative 45 degrees to 45 degrees corresponds to the right direction, the region from 45 degrees to 135 degrees corresponds to the up direction, the region from 135 degrees to 225 degrees corresponds to the left direction, and the region from 225 degrees to 315 degrees corresponds to the down direction. In the present disclosure, the judgment criteria illustrated in FIG. 6 are also referred to below as "standard judgment criteria".

On the basis of output (detected values) from the proximity sensor 18, the controller 11 calculates the direction of the vector indicated by the gesture and judges whether the calculated vector indicates one of the directions using the judgment criteria. When, for example, the vector of the gesture calculated on the basis of the output from the proximity sensor 18 is in the 90 degree direction as indicated by the arrow A1 in FIG. 6, the controller 11 can judge that the gesture is in the up direction using the standard judgment criteria in FIG. 6. When, for example, the vector of the gesture calculated on the basis of the output from the proximity sensor 18 is in the 30 degree direction as indicated by the arrow A2 in FIG. 6, the controller 11 can judge that the gesture is in the right direction using the standard judgment criteria in FIG. 6.

Figure 7:
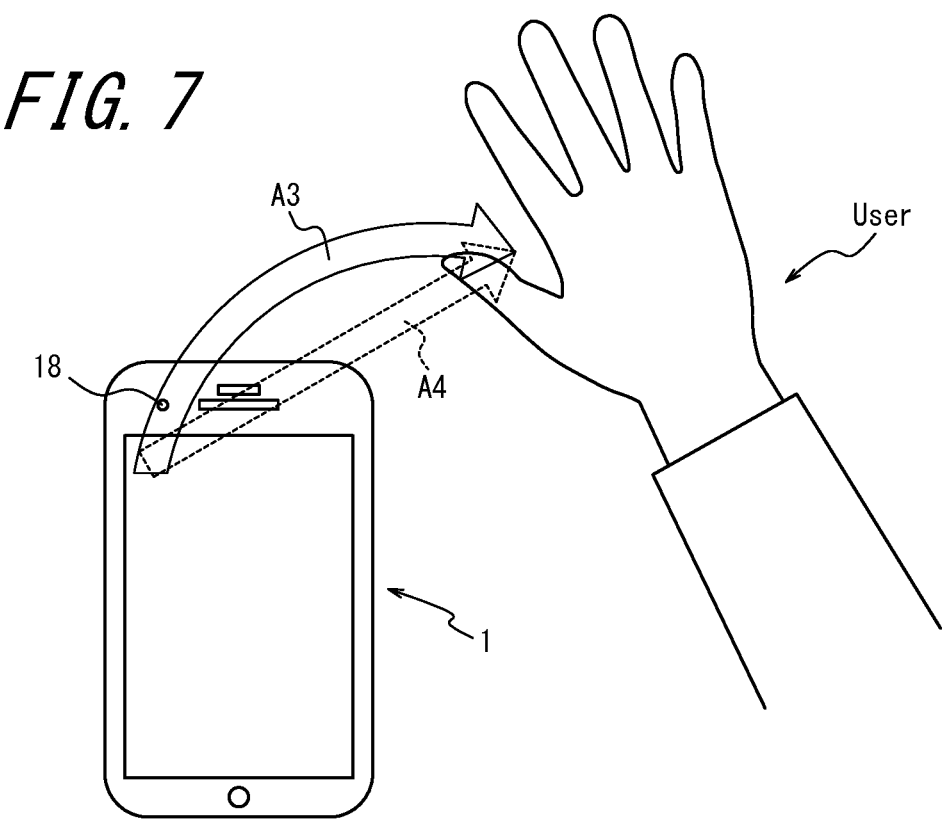
FIG. 7 schematically illustrates an example of a user gesture.

When the direction of a gesture is judged using the standard judgment criteria, the user's gesture might not be judged to be in the direction intended by the user. For example, suppose that the user performs a gesture by moving the hand from the down direction in the up direction, intending to perform a gesture in the up direction. When, for example, the user performs this gesture with the right hand, the palm of the right hand rotates about the right elbow to trace an arc due to the structure of the human body, as indicated schematically by the hand movement arrow A3 in FIG. 7. In this case, the gesture performed by the user has a component in the up direction, intended by the user, and a component in the right direction produced by the palm tracing an arc.

When the gesture schematically illustrated by the arrow A3 is performed, the controller 11 calculates the direction of the vector indicated by the gesture on the basis of output from the proximity sensor 18, which detects the gesture. Specifically, the controller 11 calculates the magnitude of the component in the up direction and the component in the right direction on the basis of output from the proximity sensor 18. The controller 11 then calculates the direction of the vector indicated by the gesture (i.e. the direction indicated schematically by the arrow A4 in FIG. 7) from the magnitudes of the component in the up direction and the component in the right direction. The controller 11 determines the direction of the gesture using the judgment criteria on the basis of the calculated direction of the vector.

When the component in the right direction is greater than the component in the up direction in the gesture indicated schematically by the arrow A3, the direction of the vector indicated by the gesture is less than 45 degrees. In this case, if the controller 11 determines the direction of the vector indicated by the gesture using the standard judgment criteria, the gesture is determined to be in the right direction. However, since the user intended to perform an operation in the up direction with the gesture, the controller 11 determining that the gesture is in the right direction and executing processing for the right direction represents an erroneous operation.

The controller 11 of the electronic device 1 according to the present embodiment determines the direction of the user's gesture in accordance with the hand the user uses to operate the electronic device 1. This facilitates prevention of the above-described erroneous operation. Specifically, the controller 11 of the electronic device 1 according to the present embodiment facilitates prevention of erroneous operation by first determining judgment criteria by which the direction of the gesture is to be judged in accordance with the hand the user uses to operate the electronic device 1 and then determining the direction of the gesture using the determined judgment criteria. The control performed by the controller 11 of the electronic device 1 according to the present embodiment is now described in detail.

(Gesture Determination Method Based on Judgment Criteria)

The controller 11 determines judgment criteria in accordance with the hand the user uses to operate the electronic device. The hand the user uses to operate the electronic device may, for example, be the hand with which the user performs gestures for operating the electronic device. When, for example, the user performs gestures with the right hand to operate the electronic device, the hand operating the electronic device refers to the right hand. Conversely, when the user performs gestures with the left hand, the hand operating the electronic device refers to the left hand. In a state in which the hand the user uses to perform gestures has been determined, the controller 11 determines judgment criteria in accordance with that hand.

When the hand the user uses to perform gestures is the right hand, the controller 11 determines the direction of a gesture using right hand judgment criteria. The right hand judgment criteria are judgment criteria that take the nature of operations with the right hand into consideration to make it easier to determine the direction of a gesture in accordance with the user's intention when the user is operating the electronic device with the right hand. The nature of operations with the right hand includes, for example, making it easier to include a component in the right direction within an operation in the up direction, as described with reference to FIG. 7. The nature of operations with the right hand also includes, for example, making it easier to include a component in the left direction within an operation in the down direction, for similar reasons as described with reference to FIG. 7.

Figure 8:
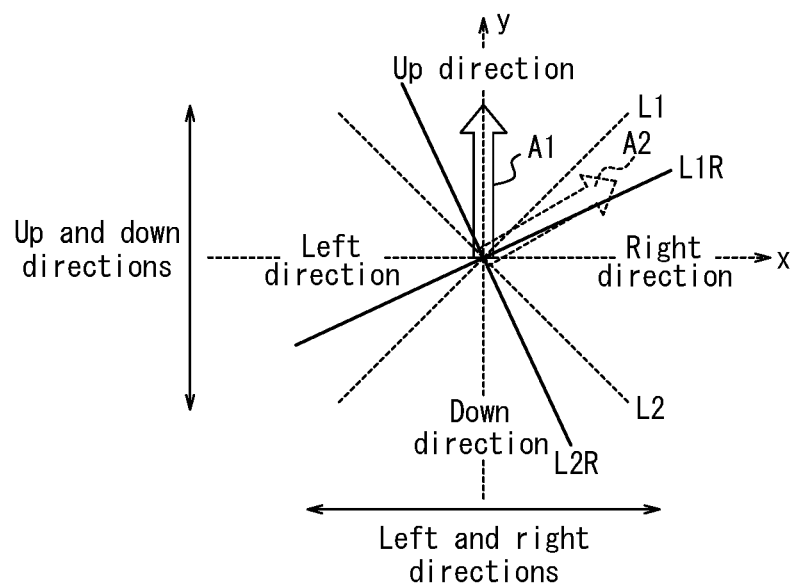
FIG. 8 illustrates an example of right hand judgment criteria.

FIG. 8 illustrates an example of right hand judgment criteria. As illustrated by the example in FIG. 8, the right hand judgment criteria are constituted by two lines, L1R and L2R. The lines L1R and L2R are the result of rotating the lines L1 and L2, indicated by dashed lines in FIG. 8, clockwise by a predetermined angle. In FIG. 8, the predetermined angle is 20 degrees. In other words, the lines L1R and L2R in FIG. 8 are the result of rotating the lines L1 and L2 clockwise by 20 degrees.

In the right hand judgment criteria indicated in FIG. 8, the four regions divided by the two lines L1R and L2R are associated with the up direction, the down direction, the right direction, and the left direction. Specifically, among the four regions divided by the two lines L1R and L2R, the region from negative 65 degrees to 25 degrees corresponds to the right direction, the region from 25 degrees to 115 degrees to the up direction, the region from 115 degrees to 205 degrees to the left direction, and the region from 205 degrees to 295 degrees to the down direction.

When the controller 11 uses the right hand judgment criteria indicated in FIG. 8, the controller 11 can judge that a gesture is in the up direction when the vector of the gesture calculated on the basis of the output from the proximity sensor 18 is in the 90 degree direction as indicated by the arrow A1. The controller 11 can also judge that a gesture is in the up direction when the vector of the gesture calculated on the basis of the output from the proximity sensor 18 is in the 30 degree direction, as indicated by the arrow A2. In other words, the gesture in the 30 degree direction indicated by the arrow A2 is determined to be a gesture in the right direction when the standard judgment criteria are used but is determined to be a gesture in the up direction when the right hand judgment criteria are used.

When a gesture is performed with the right hand, a component in the right direction is included more easily within a gesture in the up direction, as described above. When the user gestures intending to perform an operation in the up direction, and the gesture is judged to be in the 30 degree direction indicated by the arrow A2 due to a component in the right direction being included in the gesture, the controller 11 determines the gesture to be in the right direction when using the standard judgment criteria. Since the user intended to perform a gesture in the up direction, however, the determination of the gesture being in the right direction leads to erroneous operation. By contrast, the controller 11 determines that the same gesture is in the up direction when using the right hand judgment criteria. The controller 11 can thus more easily perform the control intended by the user by using the right hand judgment criteria. The electronic device 1 therefore facilitates prevention of erroneous operation during a gesture-based input operation.

Figure 9:
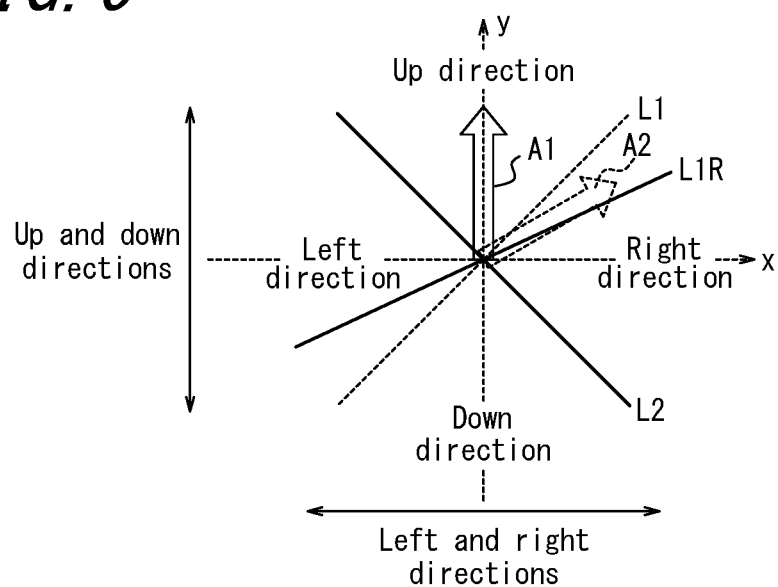
FIG. 9 illustrates another example of right hand judgment criteria.

FIG. 9 illustrates another example of right hand judgment criteria. The right hand judgment criteria illustrated in FIG. 9 are constituted by two lines, L1R and L2. The line L1R is the result of rotating the line L1 clockwise by a predetermined angle (such as 20 degrees). The line L2 is the same line as the one described with reference to FIG. 6.

In the right hand judgment criteria indicated in FIG. 9, the four regions divided by the two lines L1R and L2 are associated with the up direction, the down direction, the right direction, and the left direction. Specifically, among the four regions divided by the two lines L1R and L2, the region from negative 45 degrees to 25 degrees corresponds to the right direction, the region from 25 degrees to 135 degrees corresponds to the up direction, the region from 135 degrees to 205 degrees corresponds to the left direction, and the region from 205 degrees to 315 degrees corresponds to the down direction.

When the controller 11 uses the right hand judgment criteria illustrated in FIG. 9, the controller 11 judges that the gesture in the 90 degree direction indicated by the arrow A1 is in the up direction and that the gesture in the 30 degree direction indicated by the arrow A2 is in the up direction. Consequently, as in the case of using the right hand judgment criteria illustrated in FIG. 8, the controller 11 makes it easier to perform the control intended by the user in the case of using the right hand judgment criteria illustrated in FIG. 9 as well. The electronic device 1 therefore facilitates prevention of erroneous operation during a gesture-based input operation.

When, for example, the user performs a gesture with the right hand, a gesture that includes a component in the lower-right direction or the upper-left direction is not easily detected due to the structure of the human body, regardless of the direction in which the user intends to perform the gesture. Consequently, in the right hand judgment criteria as well, the same line as in the standard judgment criteria may be used as the line L2 forming the boundary between the lower-right direction and the upper-left direction, as illustrated in the example in FIG. 9.

When the hand the user uses to perform gestures is the left hand, the controller 11 determines the direction of the gesture using left hand judgment criteria. The left hand judgment criteria are judgment criteria that take the nature of operations with the left hand into consideration to make it easier to determine the direction of a gesture in accordance with the user's intention when the user is operating the electronic device with the left hand. The nature of operations with the left hand is symmetrical with respect to operations with the right hand and includes, for example, making it easier to include a component in the left direction within an operation in the up direction. The nature of operations with the left hand includes, for example, making it easier to include a component in the right direction within an operation in the down direction.

Figure 10:
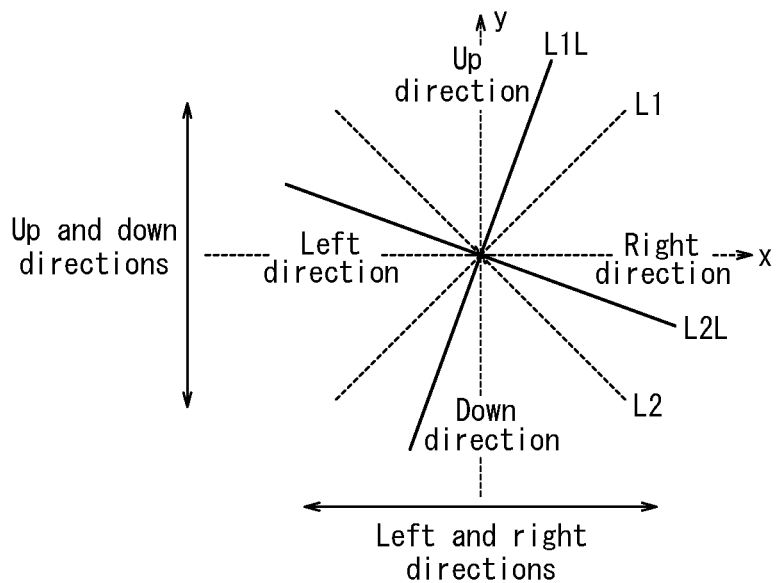
FIG. 10 illustrates an example of left hand judgment criteria.

FIG. 10 illustrates an example of left hand judgment criteria. As illustrated by the example in FIG. 10, the left hand judgment criteria are constituted by two lines, L1L and L2L. The lines L1L and L2L are the result of rotating the lines L1 and L2, indicated by dashed lines in FIG. 6, counterclockwise by a predetermined angle. In FIG. 10, the predetermined angle is 20 degrees. In other words, the lines L1L and L2L in FIG. 10 are the result of rotating the lines L1 and L2 counterclockwise by 20 degrees.

In the left hand judgment criteria indicated in FIG. 10, the four regions divided by the two lines L1L and L2L are associated with the up direction, the down direction, the right direction, and the left direction. Specifically, among the four regions divided by the two lines L1L and L2L, the region from negative 25 degrees to 65 degrees corresponds to the right direction, the region from 65 degrees to 155 degrees corresponds to the up direction, the region from 155 degrees to 245 degrees corresponds to the left direction, and the region from 245 degrees to 335 degrees corresponds to the down direction.

When the controller 11 uses the left hand judgment criteria illustrated in FIG. 10, it becomes easier to perform control intended by the user for a gesture performed with the left hand for similar reasons to those described in detail with respect to the right hand judgment criteria. The electronic device 1 therefore facilitates prevention of erroneous operation during a gesture-based input operation.

Figure 11:
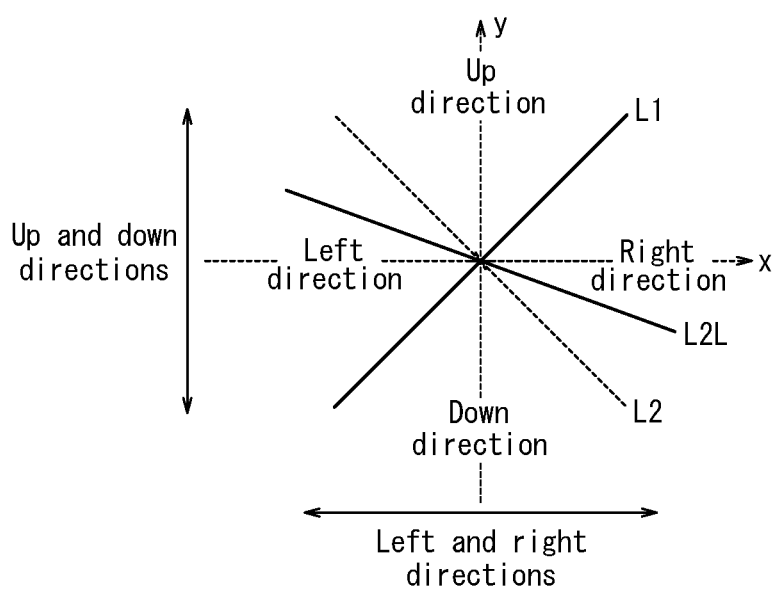
FIG. 11 illustrates another example of left hand judgment criteria.

FIG. 11 illustrates another example of left hand judgment criteria. The left hand judgment criteria illustrated in FIG. 11 are constituted by two lines, L1 and L2L. The line L2L is the result of rotating the line L2 counterclockwise by a predetermined angle (such as 20 degrees). The line L1 is the same line as the one described with reference to FIG. 6.

In the left hand judgment criteria indicated in FIG. 11, the four regions divided by the two lines L1 and L2L are associated with the up direction, the down direction, the right direction, and the left direction. Specifically, among the four regions divided by the two lines L1 and L2L, the region from negative 25 degrees to 45 degrees corresponds to the right direction, the region from 45 degrees to 155 degrees corresponds to the up direction, the region from 155 degrees to 225 degrees corresponds to the left direction, and the region from 225 degrees to 335 degrees corresponds to the down direction.

When the controller 11 uses the left hand judgment criteria illustrated in FIG. 11 as well, it becomes easier to perform control intended by the user for a gesture performed with the left hand for similar reasons to those described in detail with respect to the right hand judgment criteria. The electronic device 1 therefore facilitates prevention of erroneous operation during a gesture-based input operation.

In the explanation of FIG. 8 through FIG. 11, the rotation angle (predetermined angle) of the lines constituting the judgment criteria has been described as being 20 degrees, but the predetermined angle is not limited to 20 degrees. The predetermined angle may be any angle making it easier to determine a direction of a gesture that corresponds to the direction intended by the user.

The right hand judgment criteria and the left hand judgment criteria are not limited to the examples illustrated in FIG. 8 through FIG. 11. The right hand judgment criteria and the left hand judgment criteria may be any appropriate criteria that make it easier to determine, in accordance with the hand that performs gestures, a direction of the gesture that corresponds to the direction intended by the user.

(Hand Determination Method)

Next, a method performed by the controller 11 to determine the hand (i.e. the right hand or the left hand) that the user uses to perform gestures to operate the electronic device is described. The controller 11 determines which hand the user uses to perform gestures to operate the electronic device using one, or a combination of two or more, of the methods described here. On the basis of the determined hand, the controller 11 determines judgment criteria to use for determining the direction of a gesture (i.e. right hand judgment criteria or left hand judgment criteria) and then determines the direction of a gesture.

The controller 11 may, for example, determine the hand that performs gestures on the basis of information stored in advance in the storage 16. For example, information related to the hand that performs gestures (i.e. information related to whether gestures are performed with the right hand or with the left hand) may be set in advance by the user and stored in the storage 16. The controller 11 can determine the hand that performs gestures on the basis of the information, stored in the storage 16, related to the hand that performs gestures.

The controller 11 may, for example, determine the hand that performs gestures on the basis of an image captured by the camera 13. Specifically, the controller 11 may activate the camera 13 when performing control on the basis of a gesture. The camera 13 images the user performing a gesture. The controller 11 may determine whether the user is performing a gesture with the right hand or the left hand by analyzing the image captured by the camera 13. The controller 11 may suspend operation of the camera 13 when a gesture is performed consecutively by the same hand a predetermined number of times (such as five times) from the start of gesture-based control. When a gesture is performed consecutively by the same hand a predetermined number of times, it can be inferred that the user will likely continue to perform gestures with the same hand. Consequently, when the controller 11 suspends operation of the camera 13, the controller 11 may determine that the hand that consecutively performed gestures is still the hand performing gestures. With this approach, the controller 11 can use the judgment criteria corresponding to the hand with which the user is likely to perform gestures while also reducing the power consumption by suspending operation of the camera 13.

The controller 11 may intermittently activate the camera 13 to confirm whether the hand that the user uses to perform gestures has changed.

The controller 11 may, for example, determine the hand performing gestures on the basis of the operating state of the electronic device 1. The operating state of the electronic device 1 includes whether the electronic device 1 is at rest (resting state) or not at rest (non-resting state). The controller 11 can determine the operating state of the electronic device 1 on the basis of output of the acceleration sensor 21. When the controller 11 determines that the electronic device 1 is in the non-resting state on the basis of the output of the acceleration sensor 21, the controller 11 may determine that the user is holding the electronic device 1 with the dominant hand and may determine that the hand performing gestures is the opposite hand from the dominant hand. Conversely, when the controller 11 determines that the electronic device 1 is in the resting state on the basis of the output of the acceleration sensor 21, the controller 11 may determine that the user is not holding the electronic device 1 and may determine that the hand performing gestures is the user's dominant hand. When, for example, the user is right-handed, the controller 11 may determine that the hand that performs gestures is the left hand when determining that the electronic device 1 is in the non-resting state and may determine that the hand that performs gestures is the right hand when determining that the electronic device 1 is in the resting state. The user's dominant hand may, for example, be stored in advance in the storage 16 by user input. The user's dominant hand may, for example, be determined by the controller 11 on the basis of output from various sensors provided in the electronic device 1. For example, the controller 11 can determine whether the hand holding the electronic device is the right hand or the left hand using a known technique on the basis of the position of the fingers holding the electronic device 1, the shape of the finger touching the touchscreen display, or the like.

The controller 11 may, for example, determine the hand that performs gestures on the basis of the mode of the electronic device 1. The controller 11 may, for example, determine that the opposite hand from the user's dominant hand is the hand that performs gestures when the electronic device 1 is in the above-described kitchen mode. When the electronic device 1 is in the kitchen mode, the user is likely using a cooking utensil, such as a kitchen knife, in the dominant hand. In this case, it can be inferred that the user likely performs gestures with the opposite hand from the dominant hand. The controller 11 can therefore determine that the opposite hand from the dominant hand is the hand that performs gestures.

(Controller Processing Flow)

Figure 12:
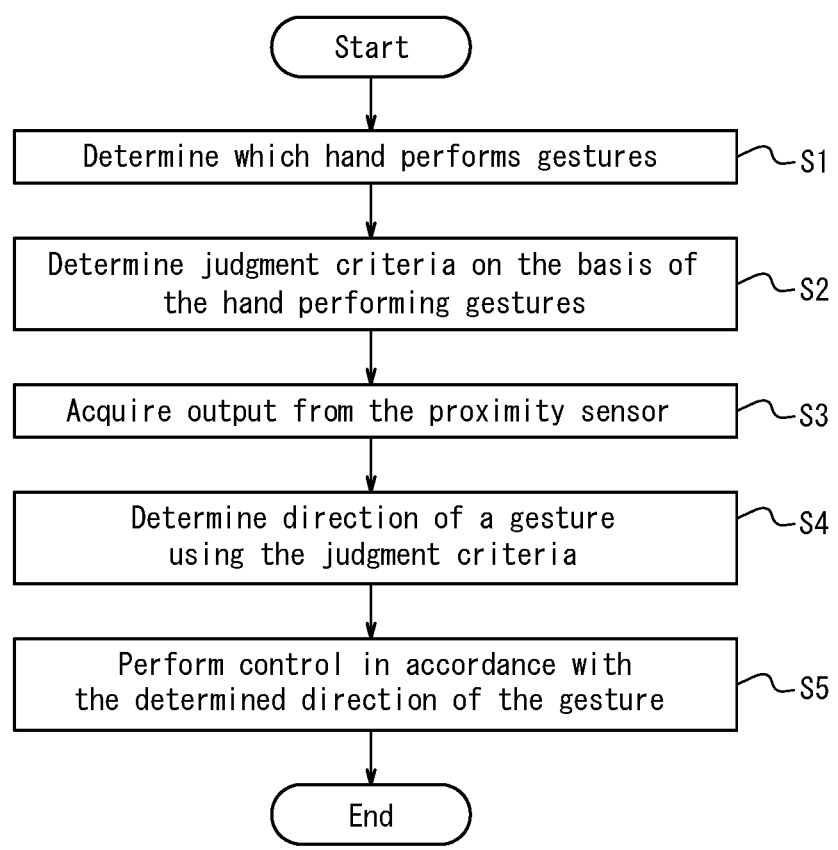
FIG. 12 is a flowchart illustrating an example of processing executed by a controller of the electronic device.

FIG. 12 is a flowchart illustrating an example of processing executed by the controller 11 of the electronic device 1.

With the above-described method, the controller 11 determines which hand the user uses to perform gestures (i.e. the right hand or left hand) (step S1).

Once the hand the user uses to perform gestures has been determined in step S1, the controller 11 determines judgment criteria to use for determining the direction of a gesture on the basis of the hand performing gestures (step S2).

The controller 11 acquires output from the proximity sensor 18 (step S3).

The controller 11 determines the direction of a gesture, using the judgment criteria determined in step S2, on the basis of the output from the proximity sensor 18 acquired in step S3 (step S4).

The controller 11 performs control in accordance with the direction, determined in step S4, of the gesture (step S5).

The electronic device 1 according to the present embodiment determines the direction of a gesture by a user on the basis of an output from the proximity sensor 18 and in accordance with the hand the user uses to perform gestures. The electronic device 1 can thereby more easily detect the user's gesture, in accordance with the hand the user uses to perform gestures, as a gesture corresponding to the user's intended operation. The electronic device 1 therefore facilitates prevention of erroneous operation during a gesture-based input operation.

Other Embodiments

Although the present disclosure has been described with reference to the accompanying drawings and examples, it is to be noted that various changes and modifications will be apparent to those skilled in the art based on the present disclosure. Therefore, such changes and modifications are to be understood as included within the scope of the present disclosure. For example, the functions and the like included in the various components, steps, and the like may be reordered in any logically consistent way. Furthermore, components, steps, and the like may be combined into one or divided.

In the above embodiment, gestures have been described as being detected by the proximity sensor 18, but gestures do not necessarily have to be detected by the proximity sensor 18. Gestures may be detected by any non-contact sensor that can detect user gestures with any appropriate non-contact method. Examples of non-contact sensors include the camera 13 and the illuminance sensor 20.

Much of the subject matter of the present disclosure is described as a series of operations executed by a computer system and other hardware that can execute program instructions. Examples of the computer system and other hardware include a general-purpose computer, a personal computer (PC), a dedicated computer, a workstation, a personal communications system (PCS), a mobile (cellular) phone, a mobile phone with a data processing function, an RFID receiver, a game device, an electronic notepad, a laptop computer, a global positioning system (GPS) receiver, and other programmable data processing apparatuses. It should be noted that in each embodiment, various operations or control methods are executed by a dedicated circuit (for example, individual logical gates interconnected in order to execute a particular function) implementing program instructions (software), or by a logical block and/or program module or the like executed by one or more processors. The one or more processors that execute a logical block and/or program module or the like include, for example, one or more of a microprocessor, CPU, application specific integrated circuit (ASIC), digital signal processor (DSP), programmable logic device (PLD), field programmable gate array (FPGA), processor, controller, microcontroller, microprocessor, electronic device, other apparatus designed to be capable of executing the functions disclosed here, and/or a combination of any of the above. The embodiments disclosed here are, for example, implemented by hardware, software, firmware, middleware, microcode, or a combination of any of these. The instructions may be program code or a code segment for executing the necessary tasks. The instructions may be stored on a machine-readable, non-transitory storage medium or other medium. The code segment may indicate a combination of any of the following: procedures, functions, subprograms, programs, routines, subroutines, modules, software packages, classes, instructions, data structures, or program statements. The code segment may transmit and/or receive information, data arguments, variables, or memory content to or from another code segment or hardware circuit in order for the code segment to connect to another code segment or hardware circuit.

The storage 16 used here may also be configured as a computer-readable, tangible carrier (medium) in any of the categories of solid-state memory, magnetic disks, and optical discs. Data structures and an appropriate set of computer instructions, such as program modules, for causing a processor to execute the techniques disclosed herein are stored on these media. Examples of computer-readable media include an electrical connection with one or more wires, a magnetic disk storage medium, a magnetic cassette, a magnetic tape, or other magnetic or optical storage medium, such as a compact disc (CD), laser Disc®, digital versatile disc (DVD®), Floppy® disk, and Blu-ray Disc® (laser disc, DVD, floppy, and Blu-ray disc are registered trademarks in Japan, other countries, or both). Further examples include a portable computer disk, random access memory (RAM), read-only memory (ROM), rewritable programmable ROM such as erasable programmable read-only memory (EPROM), electrically erasable programmable read-only memory (EEPROM), or flash memory, another tangible storage medium that can store information, or a combination of any of these. The memory may be provided internal and/or external to a processor or processing unit. As used in the present disclosure, the term "memory" refers to all types of long-term storage, short-term storage, and volatile, non-volatile, or other memory. In other words, the "memory" is not limited to a particular type and/or number. The type of medium on which information is stored is not limited, either.

The invention claimed is:

1. An electronic device comprising:
   a proximity sensor; and
   a controller configured to determine a direction of a gesture by a user on the basis of an output from the proximity sensor, using different judgment criteria in accordance with whether a hand the user uses to operate the electronic device is a right hand or a left hand, wherein the different judgment criteria associate a single predetermined direction of a gesture by the user with different directions of movement of the right hand or the left hand respectively,
   wherein the single predetermined direction corresponds to a same control process regardless of whether the right hand or the left hand is used.

2. The electronic device of claim 1, wherein the controller determines whether to use right hand judgment criteria or left hand judgment criteria different from the right hand judgment criteria, in accordance with whether the hand the user uses to operate the electronic device is a right hand or a left hand.

3. The electronic device of claim 1, wherein the controller determines the hand the user uses to operate the electronic device on the basis of at least one of a setting of the electronic device, an image captured by a camera, an operating state of the electronic device, and a mode of the electronic device.

4. The electronic device of claim 1, wherein the proximity sensor is a single non-contact proximity sensor.

5. A non-transitory computer-readable recording medium including computer program instructions to be executed by an electronic device comprising a proximity sensor and a controller, the instructions causing the electronic device to:
    determine, using the controller, a direction of a gesture by a user on the basis of an output from the proximity sensor, using different judgment criteria in accordance with whether a hand the user uses to operate the electronic device is a right hand or a left hand, wherein the different judgment criteria associate a single predetermined direction of a gesture by the user with different directions of movement of the right hand or the left hand respectively,
    wherein the single predetermined direction corresponds to a same control process regardless of whether the right hand or the left hand is used.

6. The non-transitory computer-readable recording medium of claim 5, wherein the proximity sensor is a single non-contact proximity sensor.

7. A control method for an electronic device comprising a proximity sensor and a controller, the control method comprising:
    determining, using the controller, a direction of a gesture by a user on the basis of an output from the proximity sensor, using different judgment criteria in accordance with whether a hand the user uses to operate the electronic device is a right hand or a left hand, wherein the different judgment criteria associate a single predetermined direction of a gesture by the user with different directions of movement of the right hand or the left hand respectively,
    wherein the single predetermined direction corresponds to a same control process regardless of whether the right hand or the left hand is used.

8. The control method of claim 7, wherein the proximity sensor is a single non-contact proximity sensor.

\* \* \* \* \*